(12) United States Patent
Le et al.

(10) Patent No.: US 7,894,582 B2
(45) Date of Patent: Feb. 22, 2011

(54) PHOTO TELEPHONE DIRECTORY AND METHODS OF MAKING AND USING A PHOTO TELEPHONE DIRECTORY

(75) Inventors: Son Le, Orem, UT (US); Harrison Cooper, Kaysville, UT (US)

(73) Assignee: The Vision Group, Inc., Lehi, UT (US)

( * ) Notice: Subject to any disclaimer, the term of this patent is extended or adjusted under 35 U.S.C. 154(b) by 1423 days.

(21) Appl. No.: 11/307,344

(22) Filed: Feb. 1, 2006

(65) Prior Publication Data
US 2007/0189498 A1 Aug. 16, 2007

(51) Int. Cl.
*H04M 11/00* (2006.01)
*H04M 1/00* (2006.01)
(52) U.S. Cl. .................. 379/93.19; 379/442; 379/447
(58) Field of Classification Search ... 379/352–355.023
See application file for complete search history.

(56) References Cited

U.S. PATENT DOCUMENTS

| | | | |
|---|---|---|---|
| 4,860,339 A | * | 8/1989 | D'Agosto et al. ......... 379/88.11 |
| 4,862,497 A | * | 8/1989 | Seto et al. .............. 379/355.03 |
| 2001/0040182 A1 | * | 11/2001 | Rathus et al. ............ 235/375 |
| 2006/0078106 A1 | * | 4/2006 | Willcox ................. 379/355.01 |

FOREIGN PATENT DOCUMENTS

CA 1266930 3/1990

OTHER PUBLICATIONS

PCT Application PCT/US07/61410, Search Report and Written Opinion of the International Search Authority (Feb. 14, 2008), 15 pages.

* cited by examiner

*Primary Examiner*—Joseph T Phan
(74) *Attorney, Agent, or Firm*—Kirton & McConkie (57) ABSTRACT

A telephone directory having a plurality of pages is disclosed. The pages can be moveable between a first position and a second position such that a desired page can be selected by moving pages from the first position to the second position until the desired page is at the top of a stack of pages in the first position. Each page can comprise locations for a plurality of photographs. Selectors can be provided for selecting one of the photograph locations on the selected page. Telephone numbers of persons or places depicted in photographs on the pages can be stored in a digital memory. A telephone call can be initiated to a particular person or place by selecting the page and photograph location on the page of that person or place.

17 Claims, 5 Drawing Sheets

PHOTO TELEPHONE DIRECTORY AND METHODS OF MAKING AND USING A PHOTO TELEPHONE DIRECTORY

BACKGROUND

Embodiments of the invention provide a telephone directory in which telephone numbers can be stored in a digital memory and associated with photographs on a plurality of pages. A telephone number can be retrieved by selecting one of the photographs. Although the invention is not so limited, embodiments of the invention can aide a person who is unable to read or has difficulty reading in using a telephone.

SUMMARY

Some embodiments of the invention can comprise a telephone directory having a plurality of pages. The pages can be moveable between a first position and a second position such that a desired page is selected by moving pages from the first position to the second position until the desired page is at the top of a stack of pages in the first position. Each page can comprise locations for a plurality of photographs. Selectors can be provided for selecting one of the photograph locations on the selected page. Telephone numbers of persons or places depicted in photographs on the pages can be stored in a digital memory. A telephone call can be initiated to a particular person or place by selecting the page and photograph location on the page of that person or place.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein.

Figure 1:
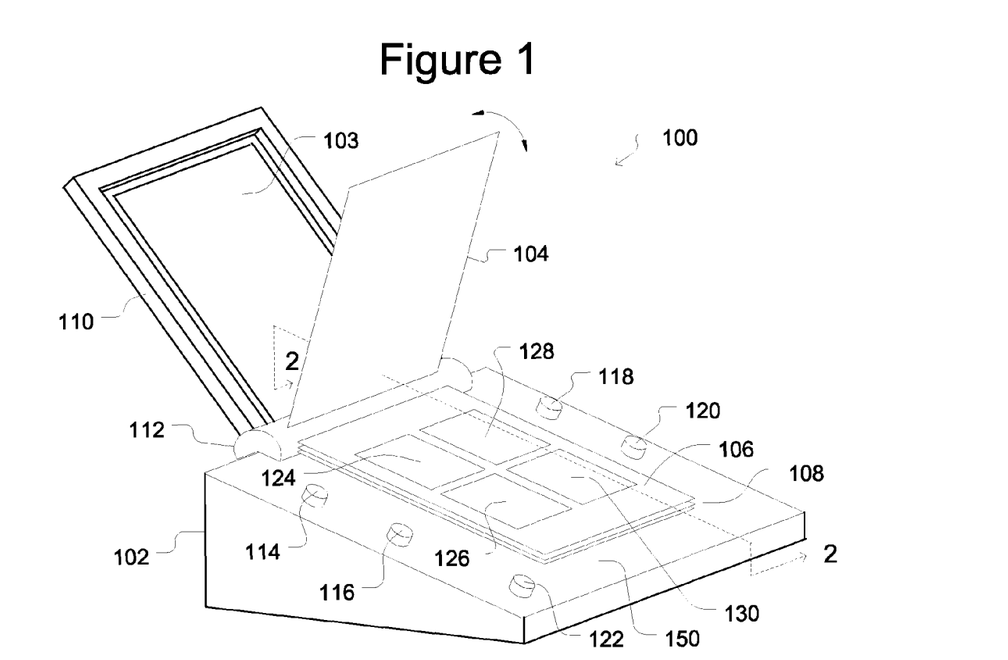
FIG. 1 illustrates an exemplary photo directory according to some embodiments of the invention.
Figure 2:
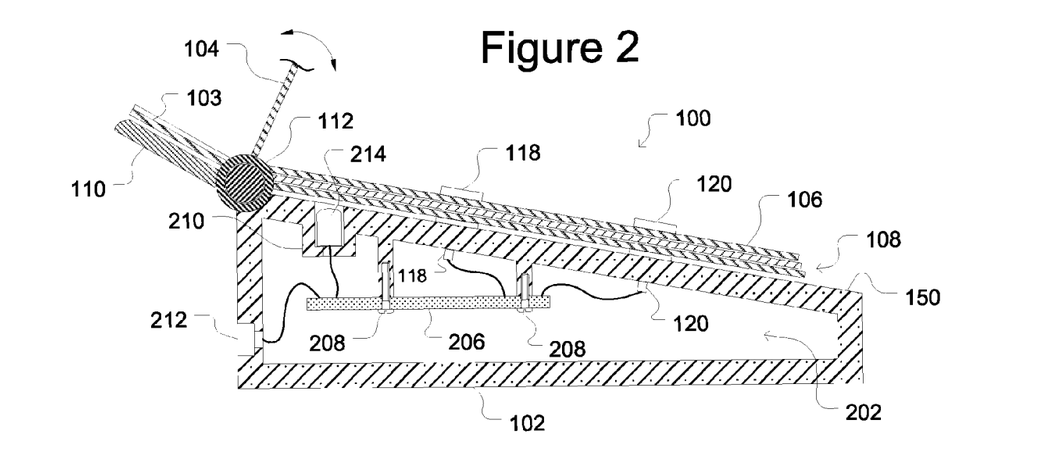
FIG. 2 illustrates a side, cross-sectional view of the photo directory of FIG. 1.

FIG. 1 illustrates a perspective view and FIG. 2 illustrates a side, cross-sectional view of an exemplary photo directory 100 according to some embodiments of the invention. As shown in FIGS. 1 and 2, the photo directory 100 holds a plurality of pages 103, 104, 106, 108 (five are shown (reference 108 refers to two pages) but fewer or more may be used) each configured with a plurality of photograph spaces 124, 126, 128, 130 (four are shown on each page but fewer or more may be used in other embodiments) for holding a photograph. Alternatively or in addition, spaces 124, 126, 128, 130 on each page can have a Braille depiction of a person or place. A button 114, 116, 118, 120 is provided for each photograph space 124, 126, 128, 130. The photo directly 100 is configured to store telephone numbers associated with each photograph. A user can initiate a telephone call to a person in the photo directory 100 by finding the person's photograph and activating the button 114, 116, 118, 120 associated with the person's photograph. That is, the user turns to the page (e.g., 106) on which the person's photograph is located and then activates the button (e.g., 118) associated with the location of the person's photograph on the page. The photo directory then automatically dials the person's telephone number.

As shown in FIGS. 1 and 2, the photo directory can comprise a housing 102, which can be made of any suitable material including without limitation plastic, metal, wood, etc. As one example, housing 102 can comprise plastic that is formed by injection molding. The photo directory 100 can also include a cover 110 that is attached to a holder 112. The cover 110 can rotate between a closed position in which the cover 110 lies against the face 150 of housing 102 and an open position. Cover 110 is shown in the open position in FIGS. 1 and 2. In the closed position (not shown in FIGS. 1 and 2), cover 110 can cover and protect the pages. In FIGS. 1 and 2, five pages are shown: page one 103, page two 104, page three 105, and a stack of two additional pages 108. More or fewer pages can be used in other embodiments or implementations.

Holder 112 is configured to hold pages 103, 104, 106, 108 and allow each page to be rotated between a first position in which the page is stacked on face 150 and a turned position in which the page is rotated to rest on cover 110 while cover 110 is in the open position. In FIGS. 1 and 2, page 103 is shown in a turned position and pages 106, 108 are shown in the first position. Page 104 is shown as being turned between the first position and the turned position. The selected page is the top page in the stack of pages in the first position on face 150. In FIGS. 1 and 2, page 106 is the selected page.

As shown in FIG. 1, page 106 includes four photo spaces 124, 126, 128, 130. Each photo space 124, 126, 128, 130 can hold a photograph of a person or place. Each of pages 103, 104, 108 have similar photo spaces for holding a photograph of a person or place. As mentioned above, photo spaces 124, 126, 128, 130 can alternatively or in addition have a Braille representation of the person or place. Four selection buttons 114, 116, 118, 120 can be attached to the housing 102, and each selection button 114, 115, 118, 120 is associated with one of the photo spaces 124, 126, 128, 130 on the selected page (page 106 in FIGS. 1 and 2). For example, in FIGS. 1 and 2, selection button 114 is associated with photo space 124; selection button 116 is associated with photo space 126; selection button 118 is associated with photo space 128; and selection button 120 is associated with photo space 130. Although the example shown in FIGS. 1 and 2 shows four photo spaces per page and four corresponding selection buttons, fewer or more photo spaces per page and fewer or more selection buttons may be used in other embodiments or implementations. As shown in FIG. 1, a memory button 122 is also attached to housing 102.

As shown in FIG. 2, housing 102 can include an interior space 202 in which a circuit substrate 206 can be located. (One circuit substrate 206 is shown, but a plurality can be used.) An electric circuit (not shown in FIG. 2) can be located on the circuit substrate 206, which can be, for example, a printed circuit board. Page sensors 214 need not, however, be located below the pages 103, 104, 106, 108 but can be located to any side or above the pages. As shown, the circuit substrate 206 can be secured to housing 102 by, for example, screws 208 or other fastening mechanisms. One or more sensor housings 210 can be provided for one or more page sensors 214, which are configured to detect which of pages 103, 104, 106, 108 is the selected page (i.e., the top page in the stack of pages in the first position on face 150 of housing 102). As mentioned above, in the depiction shown in FIGS. 1 and 2, page three 106 is the selected page. As shown in FIG. 2, page sensor(s) 214 can be electrically connected to circuit substrate 206. In FIG. 2, selection buttons 118, 120 are visible and are shown electrically connected to circuit substrate 206. Selection buttons 114, 116 and memory button 122, although not visible in FIG. 2, can similarly be electrically connected to circuit substrate 206. One or more telephone jacks 212 can also be electrically connected to circuit substrate 206. Although not shown, batteries or other sources of electrical power (e.g., an alternating current (AC) or direct current (DC) power jack) can be provided and electrically connected to circuit substrate 206.

Figure 3:
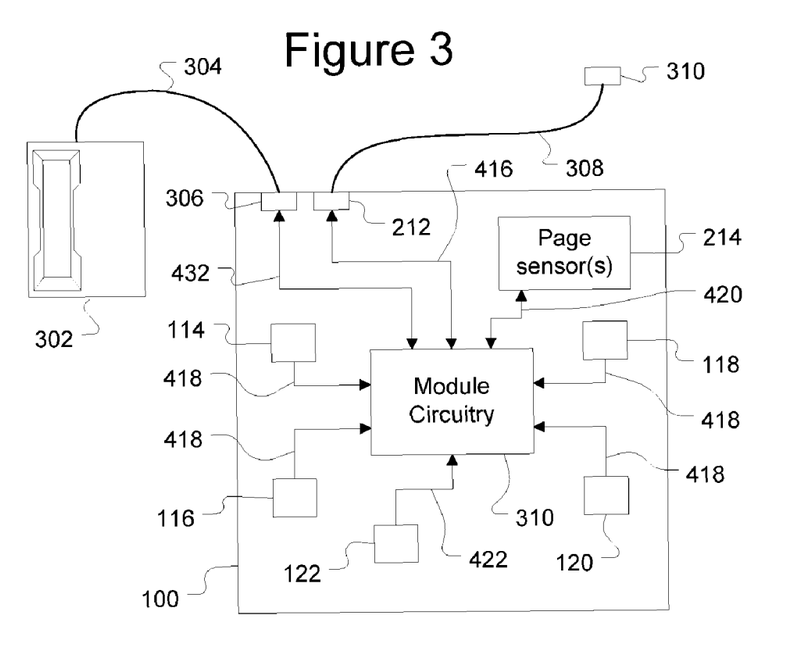
FIG. 3 shows a schematic depiction of electrical elements and connections in the photo directory of FIG. 1 according to some embodiments of the invention.

FIG. 3 shows a schematic depiction of electrical elements and connections in photo directory 100 according to some embodiments of the invention. As shown, photo directory 100 can include module circuitry 310 for controlling operation of the photo directory 100. As also shown, each of selection buttons 114, 116, 118, 120 and memory button 122 can be electrically connected to module circuitry 310. Page sensor(s) 214 can also be electrically connected to module circuitry 310. A first phone jack 306, which can be electrically connected by phone cord 304 to telephone 302, can also be electrically connected 432 to module circuitry 310. A second phone jack 212, which can be electrically connected to a telephone network through telephone jack 310 (e.g., an RJ11 or other telephone jack in the wall of a residential or commercial building that is connected to outside telephone lines) by telephone cord 308, can also be electrically connected 416 to module circuit 310 as shown in FIG. 3. Jacks 212 and 306 can be RJ11 or other telephone jacks.

Figure 4:
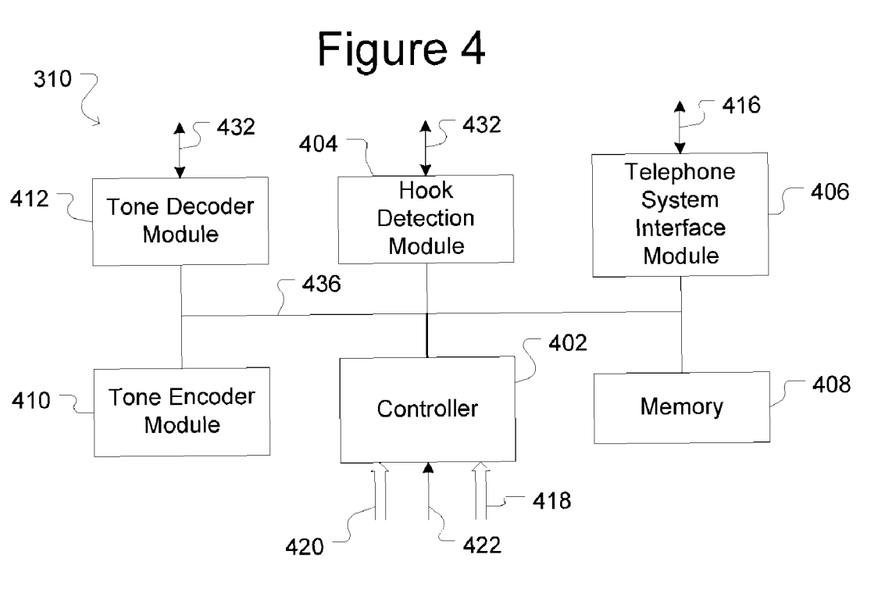
FIG. 4 shows a simplified, block diagram of an exemplary implementation of the module circuitry of FIG. 3 according to some embodiments of the invention.

FIG. 4 shows a simplified, block diagram of an exemplary implementation of module circuitry 310 according to some embodiments of the invention. As shown module circuitry 310 can include a controller 402, a hook detection module 404, a telephone system interface module 406, a memory 408, a tone encoder module 410, and a tone decoder module 412, all of which can be electrically connected to a data bus 436, which can be a parallel or serial data bus. In addition, inputs 418 from selection buttons 114, 116, 118, 120, input(s) 420 from page sensor(s) 214, and input 422 from memory button 122 can be electrically connected to controller 402.

Controller 402 can control overall operation of module circuitry 410. Controller 402 can be a microprocessor programmed to operate under control of software (including without limitation microcode and firmware) stored in memory 408. Alternatively, controller 402 can comprise hardwired logic circuitry and/or analog circuitry. As yet another alternative, controller 402 can comprise a combination of a microprocessor operating under software control and hardwired logic circuitry and/or analog circuitry. Memory 408 can comprise any type of electronic memory including without limitation a semiconductor based memory, a magnetic based memory, an optical based memory, or any combination of the foregoing. As shown, controller 402 and memory 408 can be electrically connected by bus 436.

Telephone system interface module 406 can include circuitry for interfacing with a telephone network. Such circuitry can include circuitry for receiving incoming telephone calls from the telephone network and for initiating and maintaining outgoing calls to the network. Such circuitry is well understood and is therefore not discussed in detailed herein.

Hook detection module 404 can include circuitry for determining whether the receiver of telephone 302 (see FIG. 3) is on the cradle (i.e., telephone 302 is "hung up") or the receiver of telephone 302 is off the cradle. Hook detection module 404 can receive as input 432 one or more signals from telephone 302 through telephone cord 304 and jack 306, and can determine from that signal or those signals whether the receiver of telephone 302 is on or off the cradle and therefore whether telephone 302 is in an on hook or off hook condition.

Tone decoder module 412 is configured to receive as input 432 through telephone cord 304 and jack 306 a sequence of tones and convert each tone into digital data. Each tone is generated by telephone 302 as a user pushes one of the numbers on the key pad of telephone 302. Circuitry for converting telephone tones into digital data is well known and is therefore not described in detail herein.

Tone encoder module 410 is configured to receive digital data representing telephone tones and convert the digital data into telephone tones. Again, such circuitry is well known and is therefore not described herein in detail.

Figure 5:
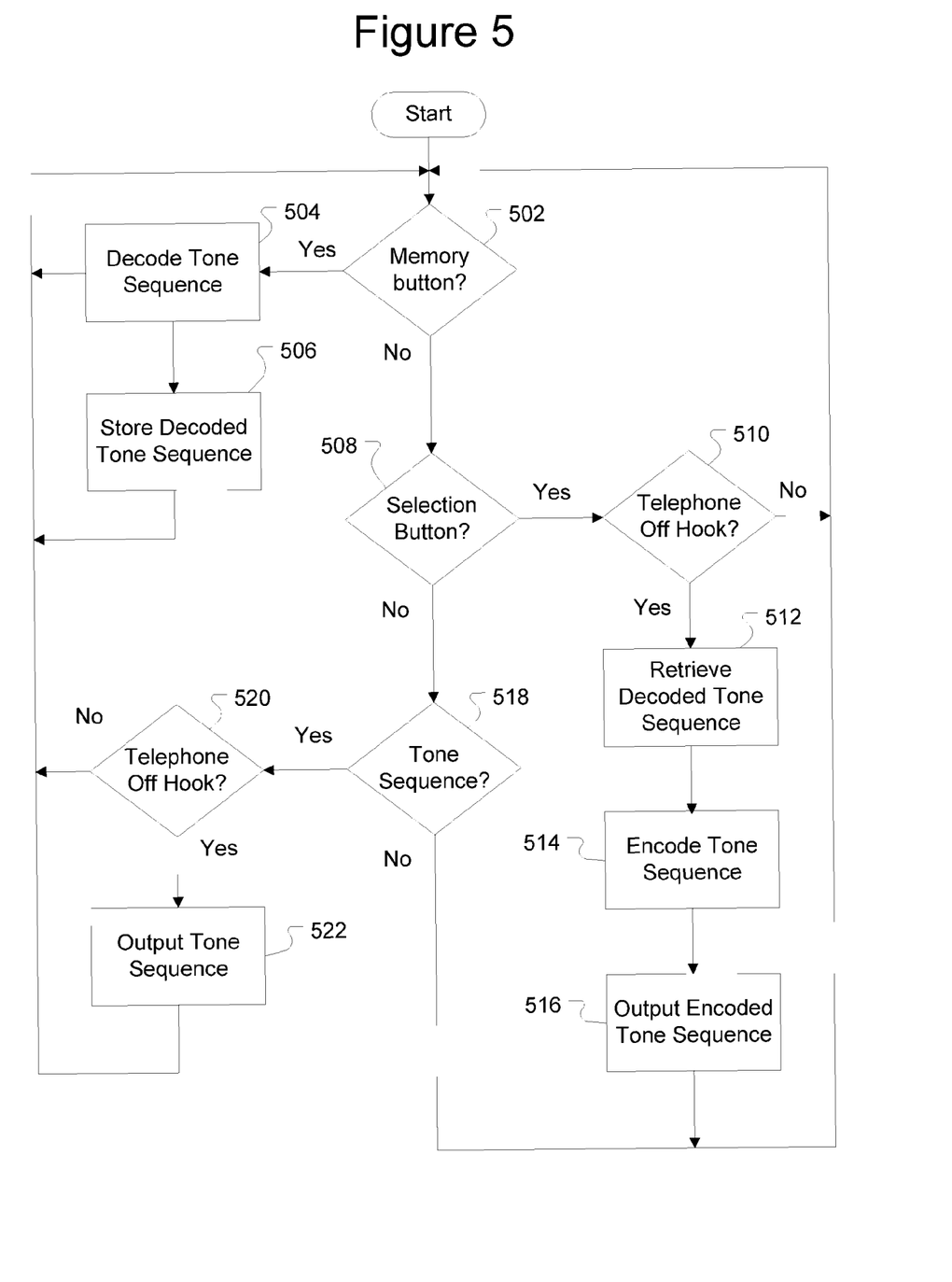
FIG. 5 illustrates exemplary operation of the controller shown in FIG. 4 according to some embodiments of the invention.

FIG. 5 illustrates exemplary operation of controller 402 according to some embodiments of the invention.

If a user of telephone 302 desires to store a telephone number in memory 408, the user can turn one or more of pages 103, 104, 106, 108 (see FIGS. 1 and 2) to select one of the pages (e.g., page 106 as shown in FIGS. 1 and 2) as discussed above. The user can place a photograph of the person or place representing the telephone number to be stored in one of the photo spaces (e.g., 124, 126, 128, 130) on the selected page (e.g., page 106). For example, the photograph may be a picture of a person. Rather than or in addition to the photograph, a Braille depiction of the person can be on one of the photo spaces 124, 126, 128, 130. The user then pushes memory button 122, keys in the telephone number into the key pad of telephone 302, and pushes the selection button 114, 116, 118, 120 associated with the photo space (e.g., one of 124, 126, 128, 130) on the selected page (e.g., page 106). For example, if the user placed the photograph on photo space 126 of page 106, the user would activate selection button 116 (see FIGS. 1 and 2).

Returning to a discussion of process 500 of FIG. 5, process 500 detects the foregoing events at step 502 by determining that memory button 122 has been activated, and process 500 branches to 504, where process 504 decodes the tone sequence generated by the user keying in the telephone number on the key pad of telephone 302. The tone sequence is received from telephone 302 through telephone cord 304 and jack 306, and tone decoder module 412 decodes the tone sequence, producing digital data representing the tone sequence and thus the telephone number entered by the user.

At 506, process 500 stores in memory 408 the digital data representing the tone sequence. The digital data is stored in a location in memory 408 that corresponds to the currently selected page (e.g., page 106 in FIGS. 1 and 2) and the photo space associated with the activated selection button. For example, a portion of memory 408 may be designated for storage of telephone numbers, and the currently selected page and the activated button can together provide the address of a location in memory 408 where the telephone number is to be stored. For example, in the example shown in FIGS. 1 and 2, there are five pages 102, 104, 106, 108, each having four photo spaces (e.g., 124, 126, 128, 130). Up to twenty telephone numbers can be identified in the photo directory shown in FIGS. 1 and 2, and a five bit address is accordingly sufficient to provide enough locations in memory 408 for all twenty telephone numbers. Of course, as mentioned above, fewer or more pages can be used, and each page can have fewer or more photo spaces. Consequently, fewer than twenty or more than twenty telephone numbers can be identified in other embodiments or implementations of photo directory 100. For the example of twenty locations shown in FIGS. 1 and 2, however, the code of the currently selected page, which is provided to controller 402 through input 420 from page sensor(s) 214 can comprise the three most significant bits of a location in memory 408 where the telephone number is to be stored, and the identify of the activated selection button (114, 116, 118, or 120) provided to controller 402 though inputs 418 can provide the two least significant bits of the location in memory 408.

Thus, in summary, at 502, process 500 determines that the user wishes to enter a telephone number to be stored in memory 408, and at 504, 506 process 500 decodes the tone sequence representing the telephone number and stores the decoded tone sequence.

If a user of telephone 302 wishes to place a telephone call to a person or place represented in the photo directory 100, the user turns to the page (e.g., one of pages 103, 104, 106, 108) containing a photograph of the person or place and activates the selection button (e.g., one of selection buttons 114, 116, 118, 120) associated with the photo space (e.g., 124, 126, 128, 130) on the selected page where the photograph is located. For example, if the user wishes to call grandmother, the user finds grandmother's picture and pushes the selection button located next to grandmother's picture.

Returning again to FIG. 5, in response, process 500 determines at 508 that a selection button (e.g., one of selection buttons 114, 116, 118, 120) was activated and branches to 510, where process 500 determines whether the telephone 302 is off the hook. As discussed above, hook detection module 404 outputs a signal to bus 436 indicting whether telephone 302 is off or on the hook. If the telephone is on the hook, process 500 does nothing and returns to the start of process 500. If process 500 determines at 510 that the telephone is off the hook, process 500 retrieves from memory 408 digital data representing a telephone number at 512, encodes the retrieved digital data into a tone sequence at 514, and outputs the encoded tone sequence through telephone system interface module 406 at 516, which initiates a telephone call from telephone 302 to the telephone whose telephone number was retrieved from memory 408 at 512. The location in memory 408 of the telephone number retrieved at 512 is specified by the selected page (e.g., page 106 in FIGS. 1 and 2) and the particular selection button (one of selection buttons 14, 116, 118, 120). The telephone number retrieved at 512 is thus the telephone number of the person or place whose photograph appears on the selected page (e.g., page 106 in FIGS. 1 and 2) in the selected photo space (e.g., one of photo spaces 124, 126, 128, 130). For example, if page 106 is the currently selected page (see FIGS. 1 and 2) and the selection button activated was button 118, the telephone number associated with page 106, photo space 128 is retrieved from memory 408 at 512 and a telephone call to that number is initiated at 514 and 516. As discussed above, data signals from page sensor(s) 214 can provide the most significant bits of a location in memory 408 from which a telephone number is retrieved at 512, and the identify of the selection button activated can provide the lest significant bits of the memory location.

Thus, in summary, at 508, process 500 determines that the user wishes to imitate a telephone call to a person or place whose photograph is in the photo directory 100. If the telephone 302 is off the hook, process 500 retrieves the telephone number of the selected person or place from memory 408, encodes the telephone number into a tone sequence, and places the telephone call to the desired recipient.

Of course, a user of telephone 302 may want to place a telephone call to a person or place who is not in the photo directory 100. To do so, the user simply enters the recipient's telephone number using the key pad of telephone 302. Referring again to FIG. 5, process 500 detects such a condition at 518 by detecting receipt of a tone sequence. Such a tone sequence can be received by controller 402 through telephone cord 304 and jack 306. In such a case, the process of FIG. 5 can branch to 520 where the process 500 determines whether the telephone is off the hook. As discussed above, hook detection module 404 (see FIG. 4) determines whether the telephone 302 is off the hook and provides a signal to controller 402 through bus 436. If the telephone is on the hook, the process 500 returns to the start of the process. If the telephone 302 is off the hook, the process 500 outputs the tone sequence 522 through telephone system interface module 406.

Figure 6:
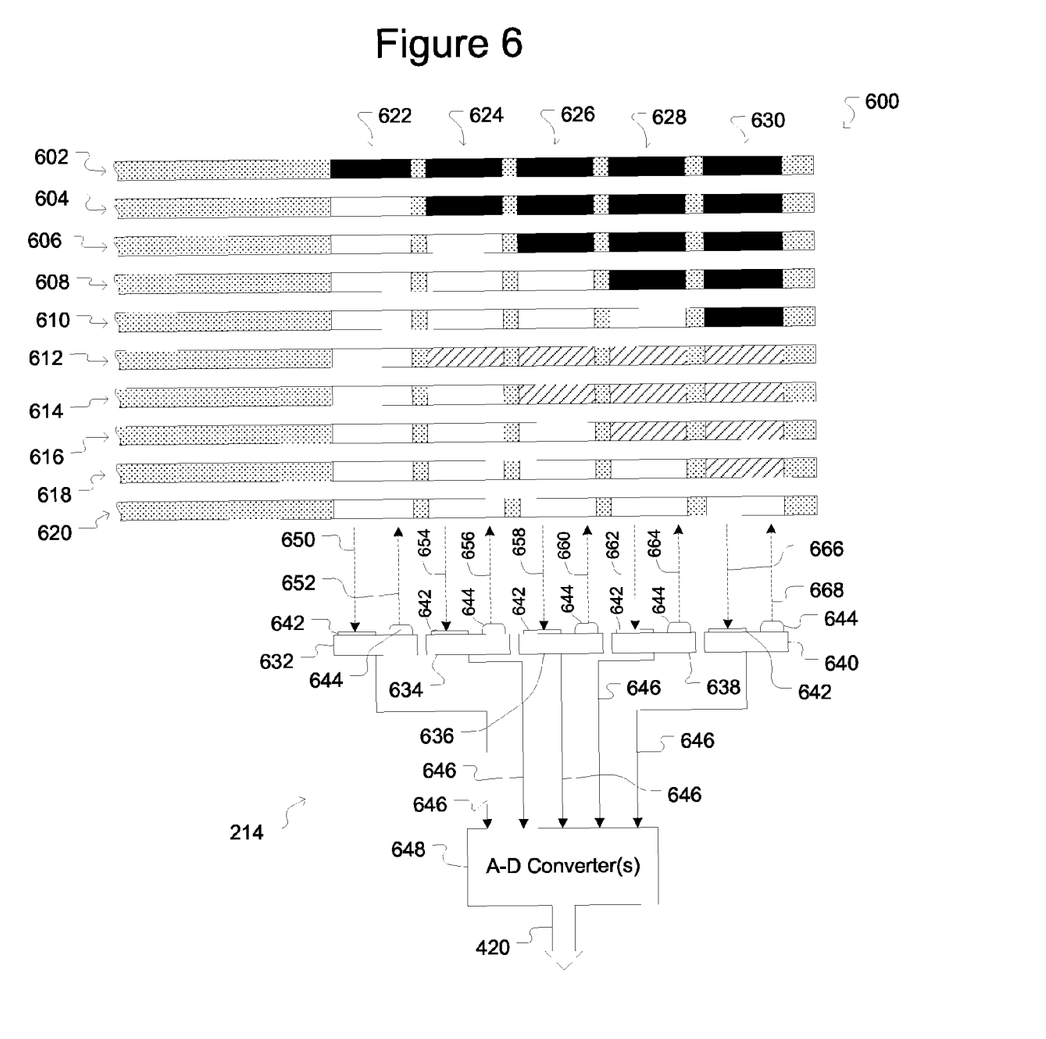
FIG. 6 illustrates an exemplary configuration of the page sensor(s) shown in FIG. 3 according to some embodiments of the invention.

FIG. 6 illustrates an exemplary configuration of page sensor(s) 214 of FIG. 3 according to some embodiments of the invention. The exemplary configuration of page sensor(s) 214 shown in FIG. 6 includes a plurality of sensors 632, 634, 636, 638, 640 (five are shown, although fewer or more can be used in other configurations). Each sensor 632, 634, 636, 638, 640 can include an energy source 644, which can produce energy beams 652, 656, 660, 664, 668. For example, each energy source 644 can generate a beam of infrared electromagnetic energy, laser light, or any other suitable form of energy. Module circuitry 310 (see FIG. 3) and more specifically controller 402 (see FIG. 4) can control generation of energy beams 652, 656, 660, 664, 668.

Each sensor 632, 634, 636, 638, 640 can also include an energy detector 642 configured to detect a reflected energy beam 650, 654, 658, 662, 666, which as will be seen, can be reflections of the energy beams 652, 656, 660, 664, and 668 generated by the energy sources 644. Each energy detector 642 can generate an output 646 signal that is proportional to the amount of energy in the reflected beam 650, 654, 658, 662, 666 that strikes the energy detector 642. As shown, the outputs 646 of energy detectors 644 can be inputs to one or more analog-to-digital converters 648, which can convert each output 646 signal into a digital representation of the amount of energy in reflected beams 650, 654, 658, 662, or 666. The output 420 of analog-to-digital converter(s) 648 can be input to controller 402 (see FIG. 4).

FIG. 6 shows an exemplary stack 600 of ten pages 602, 604, 606, 608, 610, 612, 614, 616, 618, 620, although fewer or more pages can be implemented in other configurations. Pages 602, 604, 606, 608, 610, 612, 614, 616, 618, 620 can be attached to a rotating holder, like 112 in FIGS. 1 and 2, and turned such that stack 600 can comprise any number of pages from one (e.g., page 620), two (e.g., pages 620, 618), three (e.g., pages 620, 618, 616), four (e.g., pages 620, 618, 616, 614), five (e.g., pages 620, 618, 616, 614, 612), six (e.g., pages 620, 618, 616, 614, 612, 610), seven (e.g., pages 620, 618, 616, 614, 612, 610, 608), eight (e.g., pages 620, 618, 616, 614, 612, 610, 608, 606), nine (e.g., pages 620, 618, 616, 614, 612, 610, 608, 606, 605, 602), or ten (e.g., pages 620, 618, 616, 614, 612, 610, 608, 606, 605, 602).

As shown, each page 602, 604, 606, 608, 610, 612, 614, 616, 618, 620 includes five code positions: position one 622, position two 624, position three 626, position four 628, and position five 630. The number of code positions can correspond to the number of sensors 632, 634, 636, 638, 640, and fewer or more than five code positions can be used in other configurations. Each code position 622, 624, 626, 628, 630 on each page can be configured to be one of transparent, translucent, or opaque to the energy beams 652, 656, 660, 664, 668 generated by the energy sources 644 of sensors 632, 634, 636, 638, 640. As will be seen, the intensity of each reflected beam 650, 654, 658, 662, 666 depends on the number and types (e.g., transparent, translucent, or opaque) of code positions the corresponding generated beam 652, 656, 560, 664, 668 passes through. The intensity of each reflected beam 650, 654, 658, 662, 666 can vary depending on the number of pages 602, 604, 606, 608, 610, 612, 614, 616, 618, 620 in stack 600. Thus, the code positions and the sensors 632, 634, 636, 638, 640 can detect how many pages are in stack 600 and thus which of pages 602, 604, 606, 608, 610, 612, 614, 616, 618, 620 is the top page in the stack 600 (that is, the currently selected page).

As mentioned, each code position 622, 624, 626, 628, 630 on each page can be configured to be one of transparent, translucent, or opaque to the energy beams 652, 656, 660, 664, 668 generated by the energy sources 644 of sensors 632, 634, 636, 638, 640. In FIG. 6, code positions 622, 624, 626, 628, 630 configured to be transparent are depicted as white; code positions 622, 624, 626, 628, 630 configured to be translucent are depicted with slanted lines; and code positions 622, 624, 626, 628, 630 configured to be opaque are depicted as black. In the specific configuration shown in FIG. 6, code positions 622, 624, 626, 628, 630 on pages 602, 604, 606, 608, 610, 612, 614, 616, 618, 620 are configured as follows:

|  | Code position 622 | Code position 624 | Code position 626 | Code position 628 | Code position 630 |
| --- | --- | --- | --- | --- | --- |
| Page 602 | Opaque | Opaque | Opaque | Opaque | Opaque |
| Page 604 | Transparent | Opaque | Opaque | Opaque | Opaque |
| Page 606 | Transparent | Transparent | Opaque | Opaque | Opaque |
| Page 608 | Transparent | Transparent | Transparent | Opaque | Opaque |
| Page 610 | Transparent | Transparent | Transparent | Transparent | Opaque |
| Page 612 | Transparent | Translucent | Translucent | Translucent | Translucent |
| Page 614 | Transparent | Transparent | Translucent | Translucent | Translucent |
| Page 616 | Transparent | Transparent | Transparent | Translucent | Translucent |
| Page 618 | Transparent | Transparent | Transparent | Transparent | Translucent |
| Page 620 | Transparent | Transparent | Transparent | Transparent | Transparent |

In the foregoing configurations, the number of code positions and the pattern of transparent, translucent, and opaque code positions that each generated beam 652, 656, 660, 664, 668 passes through for each possible configuration of stack 600 is different. Consequently, the intensity levels of reflected beams 650, 654, 658, 662, 666, the analog outputs 646 of sensors 632, 634, 636, 638, 640, and the digital pattern output 420 by analog-to-digital converter 648 is unique for each possible configuration of stack 600. That is, analog-to-digital converter 648 outputs 420 a particular digital pattern while only page 620 is in stack 600. Likewise, analog-to-digital converter 648 outputs 420 a different particular pattern while only pages 620 and 618 are in stack 600. Analog-to-digital converter 648 similarly outputs 420 a unique digital pattern for each of the following configurations of stack 600: three (e.g., pages 620, 618, 616), four (e.g., pages 620, 618, 616, 614), five (e.g., pages 620, 618, 616, 614, 612), six (e.g., pages 620, 618, 616, 614, 612, 610), seven (e.g., pages 620, 618, 616, 614, 612, 610, 608), eight (e.g., pages 620, 618, 616, 614, 612, 610, 608, 606), nine (e.g., pages 620, 618, 616, 614, 612, 610, 608, 606, 605, 602), or ten (e.g., pages 620, 618, 616, 614, 612, 610, 608, 606, 605, 602). The digital pattern output 420 by analog-to-digital converter(s) 648 thus indicates how many pages are in stack 600 and therefore which of pages 602, 604, 606, 608, 610, 612, 614, 616, 618, 620 is the top page in the stack 600 (that is, the currently selected page).

Code positions 622, 624, 626, 628, 630 can be located anywhere on the pages 602, 604, 606, 608, 610, 612, 614, 616, 618, 620. For example, referring to FIG. 1, code positions, like code positions 622, 624, 626, 628, 630, can be located in an upper, right side of each page 103, 104, 106, 108, and sensors 632, 634, 636, 638, 640 can be located in sensor housings, like sensor housing 210 in FIG. 2, directly below the code positions on pages 103, 104, 106, 108. Page sensor (s) 214 need not be located below the stack 600 but can, alternatively or in addition, be located to the side of the stack 600 or above the stack 600. Moreover, the pattern of transparent, translucent, and opaque code positions shown in the above table is exemplary only and other patterns can be used.

Figure 7:
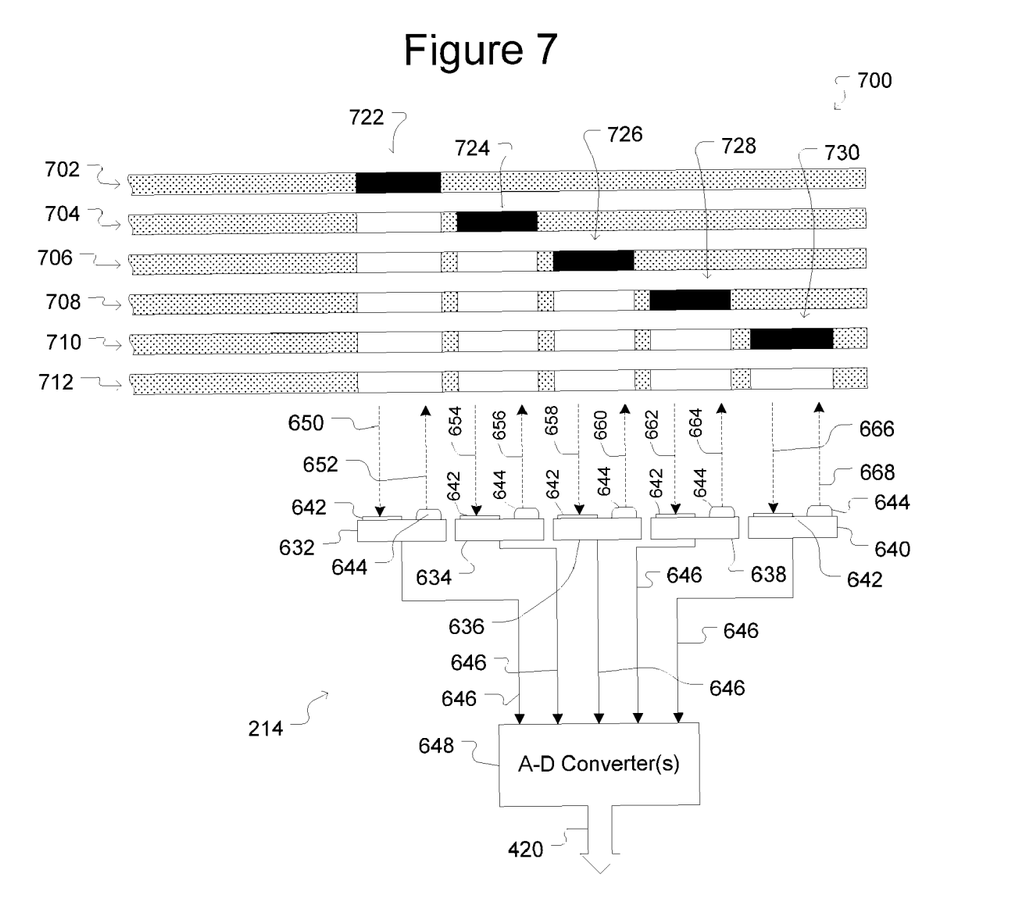
FIG. 7 illustrates another exemplary configuration of the page sensor(s) shown in FIG. 3 according to some embodiments of the invention.

FIG. 7 illustrates another exemplary stack 700 of pages 702, 704, 706, 708, 710, 712 that can be used with the page sensor(s) 214 configuration shown in FIG. 6. As shown in FIG. 7, page sensor(s) 214 can be configured the same as or similar to the configuration of page sensor(s) 214 shown in FIG. 6, except that, as discussed below, analog-to-digital converter 648 is optional in some configurations.

The exemplary stack 700 shown in FIG. 7 has six pages 702, 704, 706, 708, 710, 712, although fewer or more pages can be implemented in other configurations. Pages 702, 704, 706, 708, 710, 712 can be attached to a rotating holder, like 112 in FIGS. 1 and 2, and turned such that stack 700 can comprise any number of pages from one (e.g., page 712), two (e.g., pages 710, 712), three (e.g., pages 708, 710, 712), four (e.g., pages 706, 708, 710, 712), five (e.g., pages 704 706, 708, 710, 712), or six (e.g., pages 702, 704 706, 708, 710, 712).

As shown, there are five possible code positions on each page 702, 704 706, 708, 710, 712, and each code position corresponds to one of the sensors 632, 634, 636, 638, 640 of page sensor(s) 214. That is, code position 722 can correspond to sensor 632; code position 724 can correspond to sensor 634; code position 726 can correspond to sensor 636; code position 728 can correspond to sensor 638; and code position 730 can correspond to sensor 640. As can be seen in FIG. 7, each page 702, 704, 706, 708, 710, 712 need not include a code at every possible code position 722, 724, 726, 278, 730. For example, page one 702 has only one code, which is located at code position 722 and therefore corresponds to sensor 632. Page two 704 has two codes at code positions 722, 724; page three 706 has three codes at positions 722, 724, 726; page four 708 has four codes at positions 720, 722, 724, 726; page five 710 and page six 712 each have five codes and thus have codes at all five code positions 722, 724, 726, 728, 730. Of course, fewer or more than five code positions and sensors 632, 634, 636, 638, 640 can be used in other configurations. Moreover, the number of pages 702, 704, 706, 708, 710, 712 is exemplary and more or fewer pages can be used.

Still referring to FIG. 7, each code position 722, 724, 726, 278, 730 on a page 702, 704, 706, 708, 710, 712 can be configured to be transparent or opaque. In FIG. 7, code positions configured to be opaque are depicted as black, and code position configured to be transparent are depicted as white. As can be seen, in the example shown in FIG. 7, page six 712 includes all possible code positions 722, 724, 726, 728, 730 and all are transparent. Page five 710 also has all possible code positions 722, 724, 726, 728, 730, and code positions 722, 724, 726, 728 are transparent while code position 730 is opaque. Page four 708 has four code positions 722, 724, 726, 728, three 722, 724, 726 of which are transparent and one 728 of which is opaque. Page three 706 has three code positions 722, 724, 726, two 722, 724 of which are transparent and one 726 of which is opaque. Page two 704 has two code positions 722, 724, one 722 of which is transparent, and one 724 of which is opaque. Page one 702 has one code positions 722, which is opaque. The foregoing number and pattern of codes, including the pattern of opaque and transparent codes, is exemplary only and other numbers and patterns of codes can be used.

Moreover, code positions 722, 724, 726, 728, 730 can be located anywhere on the pages 702, 704, 706, 708, 710, 712. For example, code positions 722, 724, 726, 728, 730 can be located across the top of each page 702, 704, 706, 708, 710, 712, and sensors 632, 634, 636, 638, 640 can be located in sensor housings, like sensor housing 210 in FIG. 2, directly below the code positions on pages 702, 704, 706, 708, 710, 712. Page sensor(s) 214 need not be located below the stack 700, however, but can, alternatively or in addition, be located to a side or sides of the stack 700 or above the stack 700.

As should be apparent, while only page six 712 is in the stack 700, all of the code positions 722, 724, 726, 728, 730 against which beams 652, 656, 660, 664, 668 are directed are transparent, and none of the beams will reflect back to a sensor 632, 634, 636, 638, 640. Thus, while only page six 712 is in the stack 700, no beam is reflected back to the energy detectors 642 of sensors 632, 634, 636, 638, 640. Consequently, the output signals 646 generated by each of sensors 632, 634, 636, 638, 640 will have a "false" value. (As used herein, "false" refers to the state of the output signal 646 generated by a sensor 632, 634, 636, 638, 640 while no reflected beam is detected at its energy detector 642. For example, a "false" output signal 646 can correspond to a voltage or current within a particular range. As one non-limiting example, "false" can correspond to zero volts and/or zero current.) The foregoing pattern of output signals 646 thus corresponds to page six 712 as the topmost page in the stack 700.

While only page five 710 and page six 712 are in the stack 700, code positions 722, 724, 726, 728 are transparent while code position 730 is opaque. Consequently, beam 668 will reflect off of opaque code position 730 on page five as reflected beam 666, which will be detected at the energy detector 642 of sensor 640. The output signals 646 generated by each of sensors 632, 634, 636, 638 will have a false value, and the output signal 646 generated by sensor 640 will have a "true" value. (As used herein, "true" refers to the state of the output signal 646 generated by a sensor 632, 634, 636, 638, 640 while a reflected beam (e.g., 650, 654, 658, 662, 666) is detected at its energy detector 642. For example, a "true" output signal 646 can correspond to a voltage or current within a particular range. As one non-limiting example, "true" can correspond to a signal of about +5 volts.) The foregoing pattern of output signals 646 thus corresponds to page five 710 as the topmost page in the stack 700.

While only page four, 708, page five 710, and page six 712 are in the stack 700, code positions 722, 724, 726 are transparent while code positions 728, 730 are opaque. Consequently, beam 664 will reflect off of opaque code position 728 on page four 708, producing reflected beam 662. In addition, beam 668 will reflect off of opaque code position 730 on page five as reflected beam 666. Reflected beam 662 will be detected at the energy detector 642 of sensor 638, and reflected beam 666 will be detected at the energy detector 642 of sensor 640. The output signals 646 generated by each of sensors 632, 634, 636 will have a false value, and the output signals 646 generated by sensors 638, 640 will have a "true" value. The foregoing pattern of output signals 646 thus corresponds to page four 708 as the topmost page in the stack 700.

While only page three 706, page four, 708, page five 710, and page six 712 are in the stack 700, code positions 722, 724 are transparent while code positions 726, 728, 730 are opaque. Consequently, beam 660 will reflect off of opaque code position 726 on page three 706, producing reflected beam 658. In addition, beam 664 will reflect off of opaque code position 728 on page four 708 as reflected beam 662, and beam 668 will reflect off of opaque code position 730 on page five as reflected beam 666. Reflected beam 658 will be detected at energy detector 642 of sensor 636. In addition, reflected beam 662 will be detected at the energy detector 642 of sensor 638, and reflected beam 666 will be detected at the energy detector 642 of sensor 640. The output signals 646 generated by each of sensors 632, 634 will have a false value, and the output signals 646 generated by sensors 636, 638, 640 will have a "true" value. The foregoing pattern of output signals 646 thus corresponds to page three 706 as the topmost page in the stack 700.

While only page two 704, page three 706, page four, 708, page five 710, and page six 712 are in the stack 700, code position 722 is transparent while code positions 724, 726, 728, 730 are opaque. Consequently, beam 656 will reflect off of opaque code position 724 on page two 704, producing reflected beam 654. In addition, beam 660 will reflect off of opaque code position 726 on page three 706, producing reflected beam 658. Also, beam 664 will reflect off of opaque code position 728 on page four 708 as reflected beam 662, and beam 668 will reflect off of opaque code position 730 on page five as reflected beam 666. Reflected beam 654 will be detected at energy detector 642 of sensor 634, and reflected beam 658 will be detected at energy detector 642 of sensor 636. In addition, reflected beam 662 will be detected at the energy detector 642 of sensor 638, and reflected beam 666 will be detected at the energy detector 642 of sensor 640. The output signals 646 generated by sensor 632 will have a false value, and the output signals 646 generated by each of sensors 634, 636, 638, 640 will have a "true" value. The foregoing pattern of output signals 646 thus corresponds to page two 704 as the topmost page in the stack 700.

While all of page one 702, page two 704, page three 706, page four, 708, page five 710, and page six 712 are in the stack 700, all of the code positions 722, 724, 726, 728, 730 are opaque. Consequently, all of beams 668, 664, 660, 656, 652 will reflect off of opaque code positions 722, 724, 726, 728, 730. That is, beam 652 will reflect off of opaque code position 722 on page one 702, producing reflected beam 650; beam 656 will reflect off of opaque code position 724 on page two 704, producing reflected beam 654; beam 660 will reflect off of opaque code position 726 on page three 706, producing reflected beam 658; beam 664 will reflect off of opaque code position 728 on page four 708, producing reflected beam 662; and beam 668 will reflect off of opaque code position 730 on page five, producing reflected beam 666. Reflected beam 650 will be detected at the energy detector 642 of sensor 632; reflected beam 654 will be detected at energy detector 642 of sensor 634; reflected beam 658 will be detected at energy detector 642 of sensor 636; reflected beam 662 will be detected at the energy detector 642 of sensor 638; and reflected beam 666 will be detected at the energy detector 642 of sensor 640. The output signals 646 generated by each of sensors 632, 634, 636, 638, 640 will have a "true" value. The foregoing pattern of output signals 646 thus corresponds to page one 702 as the topmost page in the stack 700.

Because the signals 646 output by sensors 632, 634, 636, 638, 640 in FIG. 7 can thus be digital signals (e.g., indicating either the detection of a reflected beam (e.g., beams 650, 654, 656, 658, 662, 666) or the absence of a reflected beam, analog-to-digital converter 648 may not be needed in some implementations.

Although specific embodiments and applications of the invention have been described in this specification, there is no intention that the invention be limited these exemplary embodiments and applications or to the manner in which the exemplary embodiments and applications operate or are described herein. For example, as mentioned above, more or fewer than five code positions can be implemented on each page, and more or fewer than five sensors can be utilized. Likewise, more or fewer than five or ten pages can be implemented in the page stack. As another example, other types of sensors and page codes can be used. For example, a pattern of magnets can be placed in code positions on each page, and sensors 632, 634, 636, 638, 640 can be replaced with sensors that determine a strength of a magnetic field produced by the pattern of magnets on the pages. As yet another example, page sensor(s) 214 need not be located below the stack pages as shown in FIG. 2 but can be located to any one or more sides of the stack or above the stack.

What is claimed is:

1. A telephone directory comprising:
   a plurality of pages, each page comprising a plurality of locations for a plurality of graphical depictions, and each page being moveable between a first position and a second position;
   a digital memory comprising a plurality of storage locations, each said storage location corresponding to a unique graphical depiction location on one of said pages and configured to store a digital representation of a telephone number associated with the corresponding graphical depiction location;
   a controller configured to:
      determine a selected one of said pages, and
      determine a selected one of said graphical depiction locations on said selected one of said pages; and
   a page sensor configured to output one or more signals indicative of a configuration of a stack of said pages in said first position,
   wherein said page sensor comprises a plurality of sensors each configured to direct a beam of energy into said stack of pages in said first position and receive a reflected beam reflected by said stack of pages, and each said sensor is further configured to determine an amount of energy in said reflected beam.

2. The telephone directory of claim 1, wherein said one or more signals indicates an identity of a top page in said stack of pages in said first position.

3. The telephone directory of claim 1, wherein said controller is further configured to initiate a telephone call to a telephone number stored in said digital memory and associated with said selected one of said graphical depiction locations on said selected one of said pages.

4. The telephone directory of claim 3, wherein said controller is configured to initiate said telephone call by:
   converting said digital representation of said telephone number into a sequence of tones, and
   outputting said sequence of tones to a telephone network.

5. The telephone directory of claim 1, wherein said controller is further configured to store a digital representation of a received telephone number in said digital memory in a location associated with said selected one of said graphical depiction locations on said selected one of said pages.

6. The telephone directory of claim 5, wherein said controller is configured to store said digital representation by:
   receiving said telephone number as a sequence of tones, and
   converting said sequence of tones to said digital representation of said telephone number.

7. The telephone directory of claim 1 further comprising:
   a plurality of selection buttons, each one of said buttons corresponding to one of the graphical depiction locations on each of the pages; and
   a page sensor configured to output a signal identifying a selected one of the pages.

8. The telephone directory of claim 7 the signal output by the page sensor corresponds to a first portion of an address to the storage locations in the memory, and a signal indicating activation of a particular selection button corresponds to a second portion of an address to the storage location, wherein the storage location corresponds to the selected page and the graphical depiction location on the selected page corresponding to the activated button.

9. The telephone directory of claim 8, wherein the page sensor is configured to output a signal identifying a top most page in a stack of one or more of the pages in the first position.

10. The telephone directory of claim 7 further comprising a controller configured to generated from the page sensor and an activated one of the selection buttons an address of a storage location in the digital memory, wherein the storage location corresponds to the selected page and the graphical depiction location on the selected page corresponding to the activated button.

11. A method of using a programmable telephone directory, the method comprising:
   selecting one of a plurality of pages, each page comprising a plurality of graphical depiction locations for a plurality of graphical depictions;
   entering a telephone number;
   selecting one of the graphical depiction locations on the selected page; and
   storing the telephone number in a digital memory in a storage location that corresponds to the selected page and the selected graphical depiction location on the page,
   wherein the selecting one of a plurality of pages comprises generating with a page sensor a first signal identifying a top one of the pages in a stack of one or more of the pages,
   wherein the generating comprises:
      directing a plurality of energy beams into the stack of one or more of the pages,
      receiving a plurality of reflected energy beams each said reflected energy beam being one of the energy beams that has reflected off of the stack, and
      determining an amount of energy in each said reflected energy beam.

12. The method of claim 11, wherein the selecting one of the graphical depiction locations on the page corresponds to generating a second signal indicating activation of one of a plurality of buttons each corresponding to one of the graphical depiction locations on a page.

13. The method of claim 12, wherein the storing comprises:
generating from the first signal and the second signal an address in a digital memory of a storage location that corresponds to the selected page and the selected graphical depiction location on the selected page, wherein the memory includes a storage location for each graphical depiction location on each page; and
storing the entered telephone in the storage location that corresponds to the generated address.

14. The method of claim 11 further comprising storing a plurality of telephone numbers in a plurality of the storage locations in the digital memory by repeating the step of selecting one of a plurality of pages, entering a telephone number, selecting one of the graphical depiction locations on the selected page; and storing the entered telephone number.

15. The method of claim 14 further comprising dialing one of the telephone numbers stored in the digital memory, wherein the dialing comprises:
selecting one of the pages;
selecting one of the graphical depiction locations on the selected page;
retrieving from a digital memory a telephone number from a storage location in the memory that corresponds to the selected page and the selected graphical depiction location on the selected page; and
dialing the retrieved telephone number.

16. The telephone directory of claim 1, wherein the page sensor is further configured to generate the one or more signals indicative of the configuration of the stack of pages from the amount of energy determined to be in each said reflected beam.

17. The method of claim 11, wherein the generating further comprises generating the first signal from the amount of energy determined to be in each of the reflected energy beams.

* * * * *